US008624187B2

(12) United States Patent
Urey et al.

(10) Patent No.: US 8,624,187 B2
(45) Date of Patent: Jan. 7, 2014

(54) IMAGING DETECTOR ARRAY WITH OPTICAL READOUT

(76) Inventors: Hakan Urey, Istanbul (TR); Hamdi Torun, Istanbul (TR)

(*) Notice: Subject to any disclaimer, the term of this patent is extended or adjusted under 35 U.S.C. 154(b) by 0 days.

(21) Appl. No.: 11/466,347

(22) Filed: Aug. 22, 2006

(65) Prior Publication Data
US 2007/0045541 A1    Mar. 1, 2007

Related U.S. Application Data

(60) Provisional application No. 60/709,791, filed on Aug. 22, 2005.

(51) Int. Cl.
*G01J 5/00* (2006.01)
*G01J 5/02* (2006.01)

(52) U.S. Cl.
USPC ........................................ 250/338.3; 250/340

(58) Field of Classification Search
USPC .............................................. 250/338.3, 340
See application file for complete search history.

(56) References Cited

U.S. PATENT DOCUMENTS

| 4,019,015 | A  | * | 4/1977  | Hassan et al.    | 219/121.31 |
| 4,883,926 | A  | * | 11/1989 | Baldwin          | 178/19.01  |
| 6,080,988 | A  | * | 6/2000  | Ishizuya et al.  | 250/338.1  |
| 6,392,233 | B1 | * | 5/2002  | Channin et al.   | 250/338.1  |
| 6,469,301 | B1 | * | 10/2002 | Suzuki et al.    | 250/338.1  |
| 6,552,344 | B1 | * | 4/2003  | Sone et al.      | 250/338.1  |
| 2004/0130728 | A1 | * | 7/2004 | Degertekin et al.| 356/505    |

* cited by examiner

Primary Examiner — David Porta
Assistant Examiner — Carolyn Igyarto
(74) Attorney, Agent, or Firm — Venable, Campillo, Logan & Meaney PC

(57) ABSTRACT

The present invention relates to thermal detectors and the application of such to devices and methods of detecting the infrared images using thermal detectors. For example, by using optical measuring systems in combination with at least one light source to measure changes position of a movable anchored surface coupled to an absorption surface such that the movable anchored surface changes position due to absorption of infrared radiation by the absorption surface. In another example, by combining a detector pixel (infrared radiation sensitive) with an optical measuring device such as an interferometer.

21 Claims, 6 Drawing Sheets

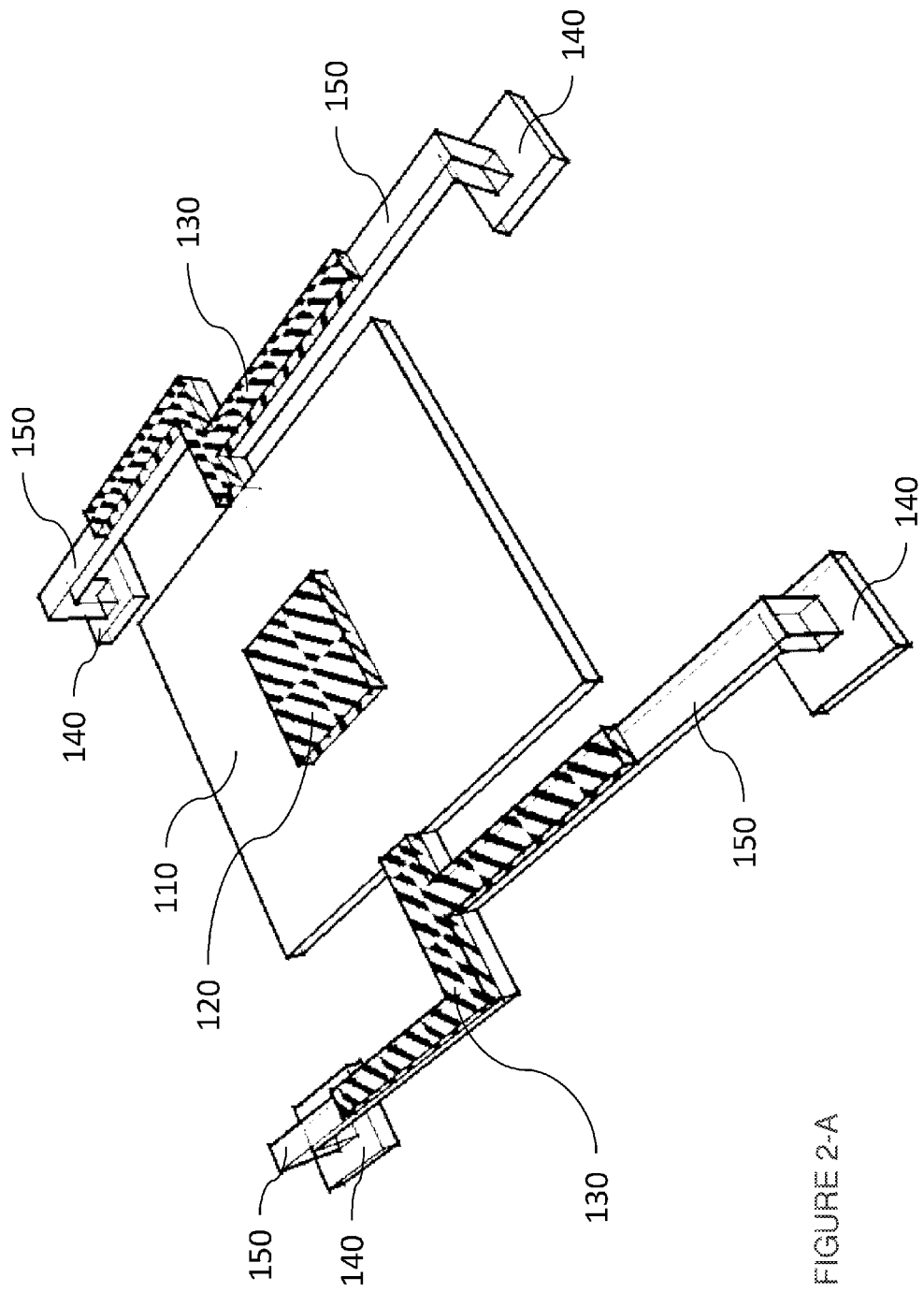
FIGURE 2-A

IMAGING DETECTOR ARRAY WITH OPTICAL READOUT

This Application claims the benefit of U.S. Provisional Patent Application Ser. No. 60/709,791, filed on Aug. 22, 2005, which is entirely incorporated herein by reference.

FIELD OF THE INVENTION

The present invention relates to the field of imaging technology. Particularly, it involves the field of infrared (IR) imaging device using a light source, diffraction grating and a detector array having at least two detector pixels. More particularly, the invention may be used by an uncooled optomechanical IR detector with optical readout.

BACKGROUND

It is well known that Infrared (IR) imaging technology has found many important application areas such as military, automobile heads-up-displays (HUD), medical diagnostics, surveillance for security, victim search for rescue teams, non-destructive testing for industrial applications, and geo-thermal event detection for environmental control. The devices used to generate the thermal map of the targets are passive devices that collect the optical signal radiated from the targets according to Planck's radiation law assuming that the targets behave as black bodies. According to the well known Planck's radiation law, the energy emitted per unit volume per unit wavelength from a blackbody (EA) is proportional to the temperature of the blackbody.

Therefore, it is possible to generate the thermal map of the target by detecting the radiated energy since the only parameters that determine the amount of energy are the temperature and the radiation wavelength. The interested spectrum of the radiation is classified as infrared (IR) band and IR band is further divided into bands as a function of wavelength as follows:

Near IR (NIR): 0.78-1 micron
Short wavelength IR (SWIR): 1-3 micron
Mid-wavelength IR (MWIR): 3-5 micron
Long-wavelength IR (LWIR): 8-14 micron
Very long-wavelength IR (VLWIR): 14-100 micron Each of these specific bands has their own properties, and specific detector technologies have been developed for these bands. For infrared imaging applications, MWIR and LWIR bands, where the transmittance of the atmosphere is high, are especially important. Transmittance through air is reduced by several factors as a result of scattering and absorption processes. The bands of operation should be selected specifically to each application. For instance, MWIR band is favorable if the target is relatively hot and the weather is clear, on the other hand LWIR band offers high sensitivity in hazy weather conditions.

Infrared imaging devices can basically be classified into two main groups according to the detection mechanism. Photon detectors deal directly with the interaction of the incoming photons with the electrons in the detector material. On the other hand, thermal detectors are the devices whose properties can be modulated by its temperature. Therefore, the detection mechanism of thermal detectors is indirect in the sense that the incoming radiation is first converted into heat energy and the generated heat energy is used to change an appropriate material property of the detector.

Information relevant to this invention can also be found in United States Patent and Parent Publication U.S. Pat. Nos. 6,576,572, 6,643,025, 6,753,969, 20040130728, 20060138347, and 20060181712 issued to Degertekin, et al.; each of the foregoing in United States Patent and Patent Publication Nos. is hereby incorporated herein by reference.

Each one of the above descriptions or references, however, suffers from disadvantages including; for example, one or more of the following, the invention is not directed at thermal detectors, or if directed at thermal detectors, the thermal detector has poor sensitivity, poor response time and noise. Other disadvantages of known thermal detectors include that they are not easily scalable and that they do not integrate a diffraction grating into each detector pixel to be combined with an optical readout to decrease the noise and improve the sensitivity.

SUMMARY

It is an object of the present invention to provide a thermal detector and related method comprising an absorption surface coupled to a movable anchored surface wherein the movable anchored surface changes position due to absorption by the absorption surface; at least one light source; and an optical measuring system to measure the movable anchored surface changes using the at least one light source. In a preferred embodiment, the movable anchored surface is a movable leg or a flexible membrane, and more preferably is made of at least two materials having sufficient differences in the coefficient of expansion to cause measurable mechanical movement (displacement) in response to thermal changes (absorption). Preferably, the optical measuring system also includes at least one detector and an interferometer comprising a reflector surface and an interference means forming a gap between the reflector surface and the interference means wherein the movable anchored surface changes position due to absorption by the absorption surface and the movable anchored surface is coupled to the interferometer to make the gap variable wherein the at least one detector detects variations in the gap and produces a detector signal related thereto. In another preferred embodiment the at least one light source is selected from the group consisting of light emitting diodes, laser diodes, vertical cavity surface emitting lasers, lasers and combinations thereof. The absorption surface is a thermal absorption surface. Also preferably, the interference means is selected from a diffraction grating or a Fabry-Perot surface. It is also preferable that the movable anchored surface is coupled to the group consisting of either an interference means or a reflector surface, and more preferably that the movable anchored surface is at least two materials having different coefficients of thermal expansion to cause measurable mechanical movement in response to thermal changes; for example, a bimaterial comprising silicon nitride and aluminum (or gold) or silicon dioxide and aluminum (or gold) and combinations thereof. Also, in a preferred embodiment, the absorption surface comprises silicon nitride, infrared absorbing thin metal films and combinations thereof, and more preferably the reflector surface comprises polysilicon, light reflecting thin metal films and combinations thereof. In yet another preferred embodiment, the invention includes at least one more thermal detector to form an infrared imaging system when coupled with an infrared lens (collimating or focusing means). In a further preferred embodiment of the invention, the optical imaging system further comprises a read-out imaging system, and more preferably the read-out imaging system is selected from the group consisting of one dimensional detectors, two dimensional detectors, and CCD cameras. Also preferably, the read-out imaging system further comprises a processing device to control the light source and process the detector signal.

The novel features that are considered characteristic of the invention are set forth with particularity in the appended claims. The invention itself, however, both as to its structure and its operation together with the additional object and advantages thereof will best be understood from the following description of the preferred embodiment of the present invention when read in conjunction with the accompanying drawings. Unless specifically noted, it is intended that the words and phrases in the specification and claims be given the ordinary and accustomed meaning to those of ordinary skill in the applicable art or arts. If any other meaning is intended, the specification will specifically state that a special meaning is being applied to a word or phrase. Likewise, the use of the words "function" or "means" in the Description of Preferred Embodiments is not intended to indicate a desire to invoke the special provision of 35 U.S.C. §112, paragraph 6 to define the invention. To the contrary, if the provisions of 35 U.S.C. §112, paragraph 6, are sought to be invoked to define the invention(s), the claims will specifically state the phrases "means for" or "step for" and a function, without also reciting in such phrases any structure, material, or act in support of the function. Even when the claims recite a "means for" or "step for" performing a function, if they also recite any structure, material or acts in support of that means of step, then the intention is not to invoke the provisions of 35 U.S.C. §112, paragraph 6. Moreover, even if the provisions of 35 U.S.C. §112, paragraph 6, are invoked to define the inventions, it is intended that the inventions not be limited only to the specific structure, material or acts that are described in the preferred embodiments, but in addition, include any and all structures, materials or acts that perform the claimed function, along with any and all known or later-developed equivalent structures, materials or acts for performing the claimed function.

BRIEF DESCRIPTION OF THE DRAWINGS

FIG. 2-A is a perspective view of a preferred embodiment of the invention represented in FIGS. 1 and 2.

DESCRIPTION OF PREFERRED EMBODIMENTS

The infrared imaging device of this invention is a thermal detector in which the incoming radiation is first converted into heat energy and then the heat energy is converted into mechanical energy that deflects the detector pixels of the detector array. To achieve mechanical deflection, the working principle of thermostats is employed. Additionally, one embodiment of the current invention measures the deflection using an interferometer having a diffraction grating and a light source. In a preferred embodiment the pixels in the detector array have structures that are connected to a movable anchored surface (preferably suitable bimaterial layers) as shown in FIG. 1.

Figure 1:
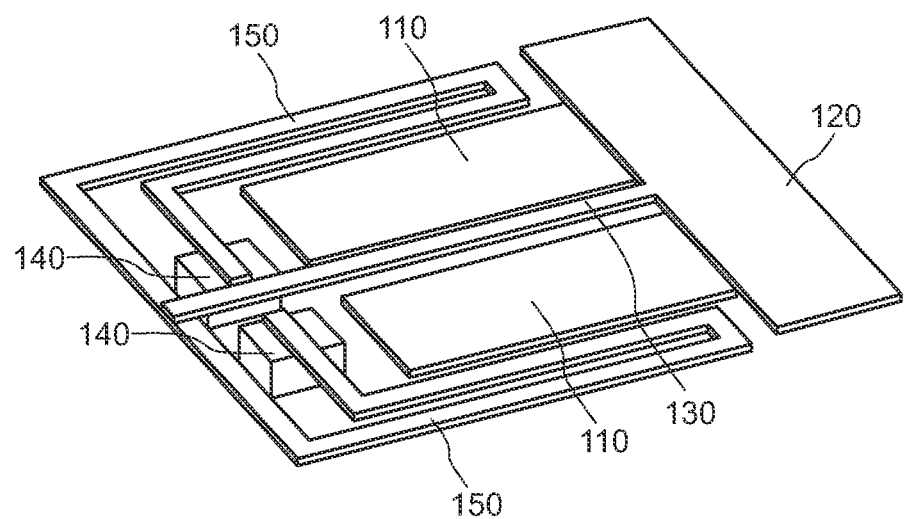
FIG. 1 is a perspective view of one preferred embodiment of one of a thermal detector.

Referring to FIG. 1, there is depicted a preferred embodiment of the one detector pixel 100 having an absorption surface 110, a reflector surface 120 and a movable anchored surface 130 (specifically a movable leg in this preferred embodiment). The absorption surface 110 can be chosen from light absorptive material such as silicon nitride (SiN) or thin metal films such as aluminum (Al) or gold (Au) and the reflector surface 120 can be chosen from any reflective material such as polysilicon or thin metals films such as aluminum (Al) or gold (Au) or polysilicon. In a preferred embodiment, the thickness of the absorption surface 110 of SiN would be 300 nanometers and for thin metals would range from 10 to 30 nanometers. In a preferred embodiment, the thickness of the reflector surface 120 for thin metals would be at least 70 nanometers. Additionally, the detector pixel 100 may have anchors 140 and thermal isolation legs 150. In the preferred embodiment shown in FIG. 1, the absorption surface 110 is a thermal absorption surface such that it absorbs heat energy (infrared radiation). The movable leg 130 of the preferred embodiment is composed of any two compatible materials that have different thermal expansion rates; for example, SiN and Al or silicon dioxide ($SiO_2$) and Al.

Figure 2:
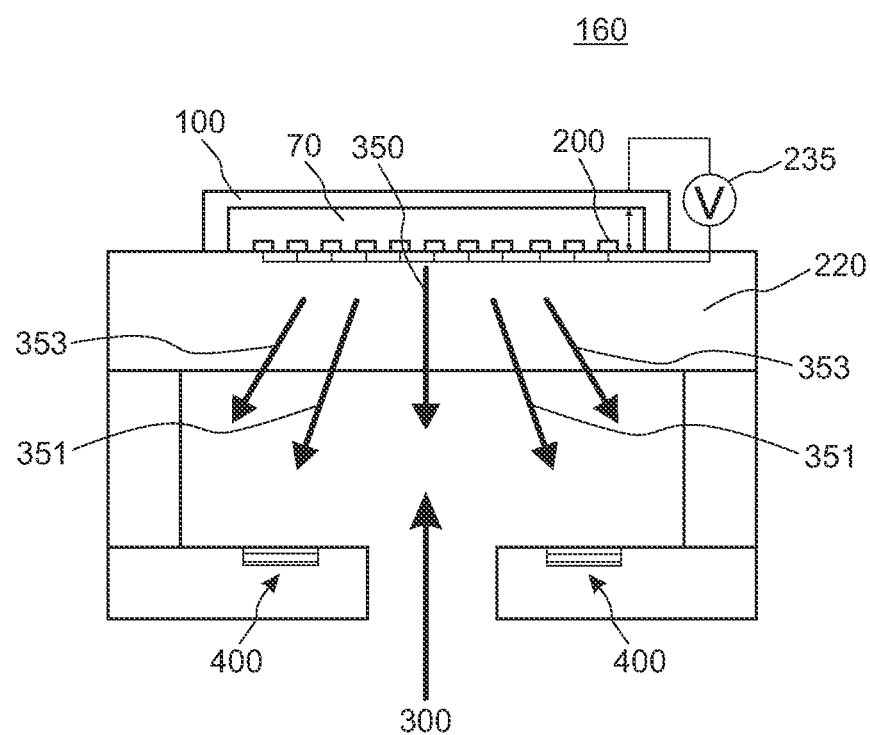
FIG. 2 is a side view of one preferred embodiment of the invention.

FIG. 2 shows a preferred embodiment of a thermal detector 160 having a detector pixel 100 coupled to an optical measuring system comprising a detector 400; a light source 300 and an interferometer having an interference means 200 (such as a diffraction grating) and a reflector surface (not shown in FIG. 2, but 120 in FIG. 1) that form a gap 70 there between; for example, the optical measuring system may comprise in one preferred embodiment a diffraction grating, the reflector surface, a light source and a detector. In this preferred embodiment, the diffraction grating 200 is preferably coupled to a transparent substrate 220 while the reflector surface 120 contained in the pixel detector 100 is coupled to the a movable anchored surface 130 contained in the pixel detector 100 (see FIGS. 1 and 2). More preferably, the movable anchored surface 130 is a movable leg. Preferably, the transparent substrate 220 can be chosen from quartz or other transparent materials. In this preferred embodiment, the detector pixel 100 is separated from the diffraction grating 200 creating a gap 70. Preferably, the distance of the gap 70 is chosen to be one-quarter of the center of the wavelength range to be measured. The reflector surface 120 is illuminated by a light source 300. Preferably, the light source 300 can be chosen from light emitting diodes, lasers, laser diodes, lasers and vertical cavity surface emitting diodes. As shown in the preferred embodiment in FIG. 2, detectors 400 can be set next to an entrance for the light source 300, or in an alternative embodiment set next to the light source 300 itself In the preferred embodiment shown in FIG. 2, the light reflected by the reflector surface 120 of the detector pixel 100 (see FIGS. 1 and 2) is diffracted to form reflected light orders; for example the zero order reflection 350 ($I_0$) is directly reflected and higher order reflections ($1^{st}$) 351, ($3^{rd}$) 353, etc. are reflected at greater angles and with lessening intensity. Additionally, a voltage (V) 235 may be applied for tuning and calibration purposes. In an alternative embodiment (not shown), the reflector surface 120 would be fixed and the movable anchored surface 130 would be coupled to the interference means 200; for example, a silicon substrate (infrared transmissive but not visible light transmissive) can be used as the reflector surface 120 while the interference means 200 could be coupled to the movable anchored surface 130 such that infrared light would pass through a first side of the silicon substrate to heat the absorption surface but visible light from the light source directed towards a second side (opposite the first side) of the silicon substrate and through the interference means 200 would be reflected.

Figure 7:
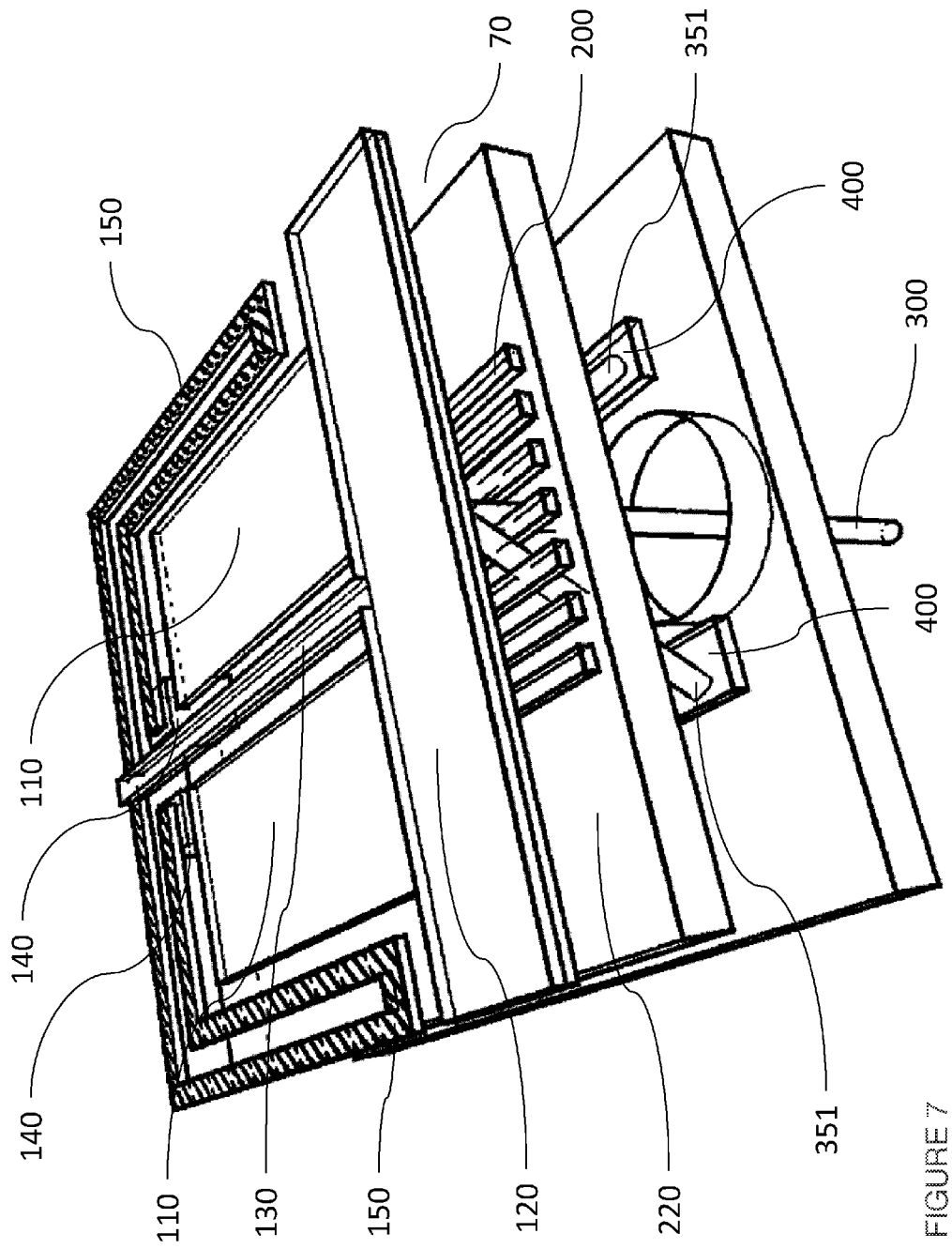
FIG. 7 is a perspective view of another preferred embodiment of the invention
Figure 8:
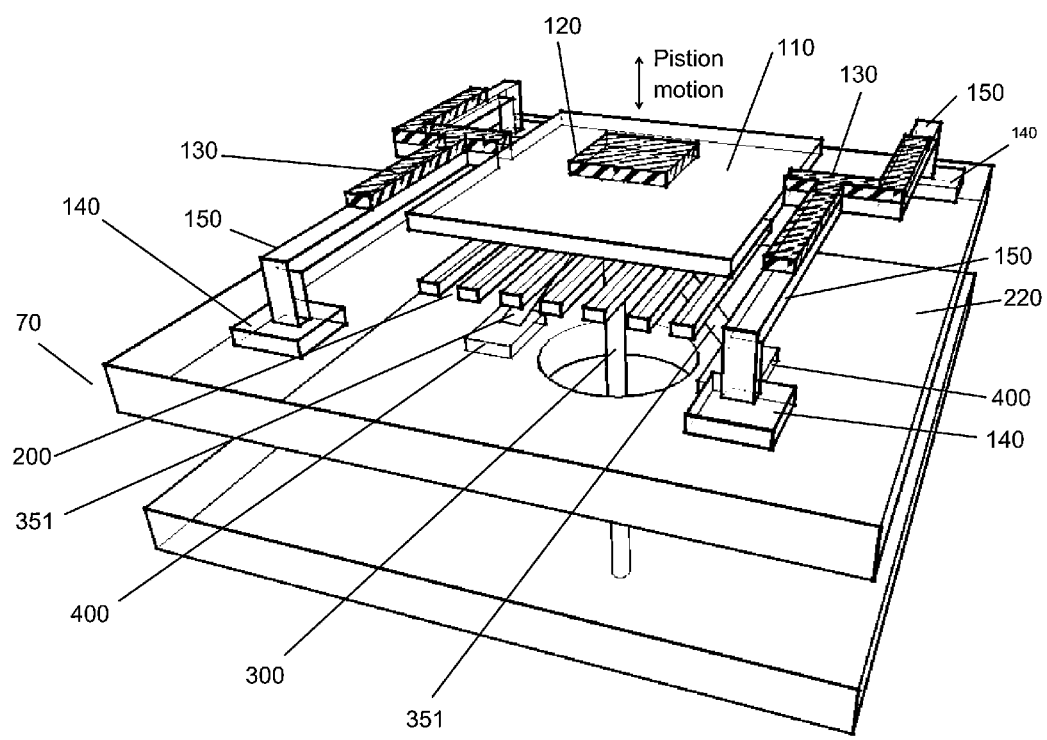
FIG. 8 is a perspective view of another preferred embodiment of the invention.

FIGS. 2-A and 8 show another view of preferred embodiment shown in FIGS. 1, 2 and 7.

Figure 3:
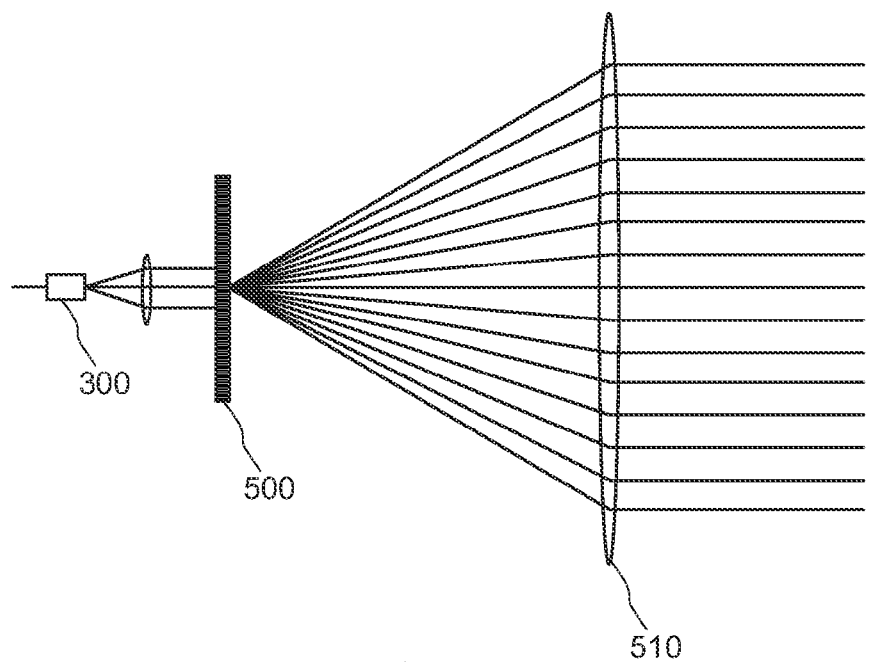
FIG. 3 is a diagrammatic view of a preferred embodiment of a light source for the invention.
Figure 4:
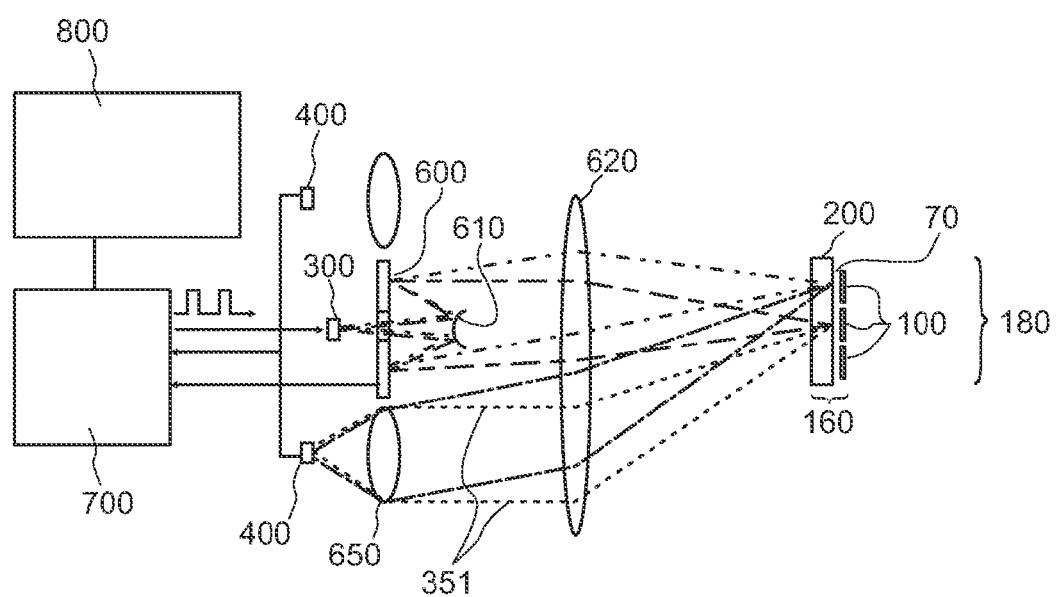
FIG. 4 is a diagrammatic view of a preferred embodiment of the invention.

In a preferred embodiment of the invention shown in FIG. 3, the light source 300 may be split into many beams so that it may illuminate multiple thermal detectors having detector pixels 100 such as one thousand detector pixels or more using a micro-optical element 500 such as a fan out diffraction grating and a lens 510. In an alternative embodiment shown in FIG. 4, the light source 300, may be scanned across an array 180 of at least two thermal detectors 160; for example, using a microelectromechanical scanner 600, a mirror 610, and a first lens 620 such as a convex lens. In this preferred embodiment, the reflector surface 120 of the detector pixels 100 (see FIG. 1 also) reflects light through an interference means 200 which in this preferred embodiment is a focal plan array comprising one or more diffraction grating to create reflected light orders, and in this preferred embodiment, the first order reflection 351 is focused by the first lens 620 on a optical component 650 (a second lens) to focus it on the detector 400. The optical measuring system, in a preferred embodiment, includes a read-out imaging system to image the focal plane image of the at least two detector pixels. In a preferred embodiment, the light source 300 is controlled by a processing device 700 such as a special or general-purpose computer or a microprocessor. The light source 300 may be controlled by a microprocessor 700 such that the light may be modulated by frequency, wavelength and/or intensity; and more preferably, the modulation of the light source 300 may then be multiplexed with the information received from the detector 400 such that an image of the thermal emission of the black body may be constructed (800). In a more preferred embodiment of the invention, some of the thermal detectors 160 may be designated for reference so that their reflected order signals may be used to cancel noise from the thermal detectors 160 that are active.

Figure 5:
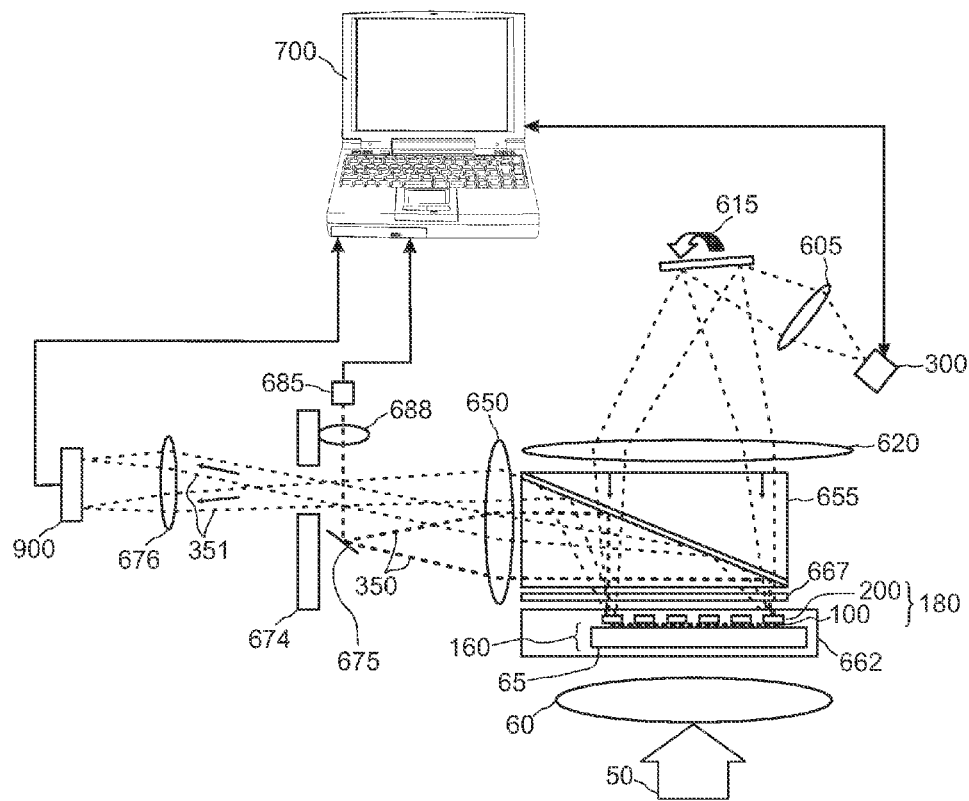
FIG. 5 is a diagrammatic view of another preferred embodiment of the invention.

In yet another preferred embodiment shown in FIG. 5, a light source 300 is scanned across a detector array 180 through a lens 620 using a light source directing device 605 (for example a lens) and a two dimensional scanner 615 such as a rotating stage. Preferably, the light source 300 can be modulated; for example, using a laser combined with an acousto-optic modulator (AOM) or a laser diode and more preferably the modulated light source 300 may be controlled using either frequency, wavelength, amplitude (intensity) or combinations thereof by a processing device 700 such as a general or specific purpose computer or microprocessor. In this preferred embodiment, the detector array 180 comprising an interference means (in a focal plane array) and the detector pixels are placed in a controlled environment 662; for example, a temperature stabilized vacuum is used for thermal detectors. In this preferred embodiment, infrared radiation 50 is directed through an infrared lens 60 and through a silicon substrate 65 (transmissive to infrared light but not visible light) which is used as the reflector surface 120 while the interference means 200 is coupled to the movable anchored surface 130 (preferably, a movable leg) such that infrared light would pass through a first side of the silicon substrate 65 to heat the absorption surface 110 (see FIG. 1) but visible light from the light source 300 is directed towards a second side (opposite the first side) of the silicon substrate and reflected from the silicon substrate 65 through the interference means 200. The reflected order light (zero order reflected order light 350 and first order reflected order light 351) is then reflected through at least one optical component 650. In this preferred embodiment, the first order reflected order light 351 is directed through a polarizing beam splitter 655, a quarter wave plate 667, a spatial filter 674, and a second lens 676 to a two dimensional detector 900; for example, a CCD camera. In this preferred embodiment, the quarter wave plate rotates the light polarization by 90 degrees (by the light passing through it twice) such that it increases the light reflected to the detectors and minimizes any light that would be reflected to the light source 300. The zero order reflected order light 350 is directed by the polarizing beam splitter 655 to a mirror 675 and through a third lens 688 to focus on a zero order detector 685; for example a photo diode or array of photo diodes. The processing device 700 can use the signal received from the two dimensional detector 900 to modulate the light source 300 so that the dynamic range can be expanded. For example, the light source illumination (intensity or amplitude) can be modulated using feedback from the CCD camera corresponding to each detector pixel 100 to increase the optical detection dynamic range. Likewise, the frequency and wavelength could be modulated in real time with feedback from the two dimensional detector 900. In this preferred embodiment, the zero order reflected order light may be detected for noise cancellation and signal equalization.

Figure 6:
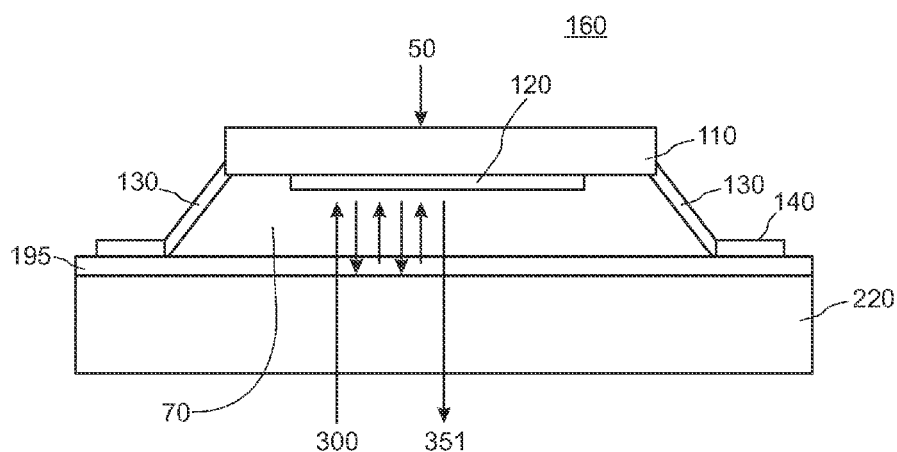
FIG. 6 is a side diagrammatic view of another preferred embodiment of one of a thermal detector.

FIG. 6 shows an alternate preferred embodiment of a thermal detector 160 comprising an optical measuring system using a Fabry-Perot (FP) interferometer. As shown in the alternative preferred embodiment in FIG. 6, the thermal detector 160 comprises an absorption surface 110 coupled to a reflector surface 120 and a movable anchored surface 130 (preferably a flexible membrane) coupled to an anchor 140 coupled to a Fabry-Perot surface 195 (also known as a distributed Bragg reflector (DBR) surface for Fabry-Perot interferometer (FP) in this preferred embodiment) thereby forming a gap 70; and more preferably the Fabry-Perot surface 195 is coupled to a transparent substrate 220. The incoming infrared radiation 50 is absorbed by an absorption surface 110 having a reflector surface 120 such that the absorbed heat causes movable anchored surface 130 (preferably in this embodiment a bimaterial cantilever or a flexible membrane device) to deflect and change the gap 70 which changes the FP interferometer. If the gap is biased to a sensitive region (such as the mid-point of the infrared wavelength range of interest) the measurement of the reflected light will give information about the deflection in the bimaterial cantilever proportional to infrared radiation 50. More preferably, the gap is chosen to be one-quarter of the center of the wavelength range to be measured to enhance the absorption. In this read-out configuration, no diffraction grating is needed and the absorption surface 110 and read-out cavity of the Fabry-Perot interferometer can be biased to the optimum points independent of each other.

FIG. 7 shows another preferred embodiment with cantilever like structures. In another preferred embodiment, the pixel overview of the detector design is shown in FIGS. 2-A and 8 where the membrane hangs from the mid portions by the cantilever like structures. Due to the symmetry in the design the membrane motion is parallel to the substrate on which there are the fingers of diffraction gratings. As the membrane moves up and down relative to the gratings as a result of absorbed IR radiation, the light intensity at the diffraction orders is modulated. For thermal detectors, such as those in FIG. 2, resonant frequency for a first mode analysis is almost 40 kHz while there is good separation between the resonant frequency first mode and the resonant frequency second mode is around 120 kHz; in a preferred embodiment, the movable leg is composed of 500 nm Al on top of 500 nm $SiN_x$.

In the preferred embodiments of this invention the interferometer may be of any known type; for example reflecting surface, diffraction grating, Fabry-Perot, etc. Further, the interference means of the preferred embodiments of the invention may include one or more elements such as a single diffraction grating, two diffraction gratings, multiple diffraction gratings; a single Fabry-Perot surface or multiple Fabry-Perot surface; more preferably when two or more gratings are employed the gratings are oriented at different angles or have different grating periods to provide enhanced deflection measurement range due to varying amounts of deflection at different parts of the detector pixel. In a preferred embodiment of the invention the light source may comprise one or more narrow spectrum sources, and more preferrably coherent light sources; for example, the light source can use multiple wavelenghts to enhance the dynamic range of detection such as the preferred use of two coherent (laser) radiation have wavelengths of 620 nm and 670 nm.

The preferred embodiment of the invention is described above in the Drawings and Description of Preferred Embodiments. While these descriptions directly describe the above embodiments, it is understood that those skilled in the art may conceive modifications and/or variations to the specific embodiments shown and described herein. Any such modifications or variations that fall within the purview of this description are intended to be included therein as well. Unless specifically noted, it is the intention of the inventor that the words and phrases in the specification and claims be given the ordinary and accustomed meanings to those of ordinary skill in the applicable art(s). The foregoing description of a preferred embodiment and best mode of the invention known to the applicant at the time of filing the application has been presented and is intended for the purposes of illustration and description. It is not intended to be exhaustive or to limit the invention to the precise form disclosed, and many modifications and variations are possible in the light of the above teachings. The embodiment was chosen and described in order to best explain the principles of the invention and its practical application and to enable others skilled in the art to best utilize the invention in various embodiments and with various modifications as are suited to the particular use contemplated.

What is claimed is:

1. A thermal detector comprising:
    an absorption surface coupled to a movable anchored surface having at least one thermal isolation leg and at least one anchor wherein the movable anchored surface changes position due to absorption by the absorption surface;
    at least one light source; and
    an optical measuring system to measure the movable anchored surface changes using the at least one light source
    wherein the optical measuring system comprises at least one detector and an interferometer comprising a reflector surface and at least one diffraction grating forming a gap between the reflector surface and the at least one diffraction grating wherein the movable anchored surface changes position due to absorption by the absorption surface and the movable anchored surface is coupled to the interferometer to make the gap variable wherein the at least one detector detects variations in the gap to produce a detector signal and wherein the reflector surface changes position, with a piston motion, parallel to the at least one diffraction grating.

2. The thermal detector of claim 1 wherein the gap is chosen to be one-quarter of a center of a wavelength range to be measured.

3. The thermal detector of claim 1 wherein the at least one light source is selected from the group consisting of light emitting diodes, laser diodes, vertical cavity surface emitting lasers, lasers and combinations thereof.

4. The thermal detector of claim 1 wherein the movable anchored surface comprises at least two materials having different coefficients of thermal expansion to cause measurable mechanical movement in response to thermal changes.

5. The thermal detector of claim 1 wherein the absorption surface comprises silicon nitride, infrared absorbing thin metal films and combinations thereof.

6. The thermal detector of claim 1 further comprising at least one more thermal detector to form an infrared imaging system when coupled with an infrared lens.

7. The detector of claim 6 further comprising a read-out imaging system.

8. The thermal detector of claim 7 wherein the read-out imaging system is selected from the group consisting of at least one detector, one dimensional detectors, two dimensional detectors, CCD cameras and combinations thereof.

9. The detector of claim 7 wherein the read-out imaging system further comprises a processing device to control the light source and process the detector signal.

10. A method to produce an image from infrared radiation comprising the steps of:
    creating an array of thermal detectors using at least two thermal detectors wherein each of the at least two thermal detectors comprises at least one thermal isolation leg, least one anchor, at least one reflector surface, and at least one absorption surface for absorbing infrared radiation coupled to a movable anchored surface;
    focusing infrared radiation, using an infrared imaging system, on the array of thermal detectors wherein absorbing infrared radiation causes the movable anchored surface to move;
    coupling the at least one reflector surface to the movable anchored surface and to an interferometer comprising at least one diffraction grating and wherein the reflector surface position, with a piston motion, parallel to the at least one diffraction grating;
    detecting changes in the movable anchored surface using at least one light source coupled to the interferometer and at least one detector; and
    producing an image using a processing device to process the detected changes in the movable anchored surface.

11. The method of detecting the infrared image in claim 10 wherein the step of coupling an interferometer to the movable anchored surface comprises forming a gap by placing the at least one diffraction grating between the at least one reflector surface and the at least one light source.

12. The method of detecting the infrared image in claim 11 wherein the step of forming the gap further comprises spacing the at least one diffraction grating from the at least one reflector by one-quarter of a center wavelength of a wavelength range to be measured.

13. The method of detecting the infrared image in claim 12 wherein the step of detecting changes in the movable anchored surface using at least one light source coupled to the interferometer and at least one detector comprises detectors selected from the group consisting of at least one one-dimensional detectors, at least one two-dimensional detectors, photodiodes, photodetectors and CCD cameras and combinations thereof.

14. The method of detecting the infrared image in claim 13 further comprising the step of placing at least one optical component between the at least one two-dimensional detector and the at least one diffraction grating.

15. The method of detecting the infrared image in claim 14 wherein the step of placing at least one optical component between the at least one two-dimensional detector and the at least one diffraction grating comprises using at least one optical component selected from the group consisting of polarizing beam splitters; lenses; spatial filters, mirrors, quarter waveplates and combinations thereof.

16. The method of detecting the infrared image in claim 12 further comprising the step of scanning the at least one light source across the at least two thermal detectors.

17. The method of detecting the infrared image in claim 12 further comprising the step of scanning the at least one light source across the at least two thermal detectors.

18. The method of detecting the infrared image in claim 17 further comprising a step of modulating of the at least one light source is selected from the group consisting of frequency modulation, intensity modulation, wavelength modulation and combinations thereof.

19. The method of detecting the infrared image in claim 12 wherein the step of creating the thermal array further comprises creating at least one reference thermal detector.

20. The method of detecting the infrared image in claim 12 further comprising the step of monitoring at least two zero order reflections using a zero order detector.

21. A thermal detector comprising:
an absorption surface coupled to a movable anchored surface having at least one thermal isolation leg and at least one anchor wherein the movable anchored surface changes position due to absorption by the absorption surface;
at least one light source; and
an optical measuring system to measure the movable anchored surface changes using the at least one light source
wherein the optical measuring system comprises at least one detector and an interferometer comprising a reflector surface and at least one diffraction grating forming a gap between the reflector surface and the at least one diffraction grating wherein the movable anchored surface changes position due to absorption by the absorption surface and the movable anchored surface is coupled to the interferometer to make the gap variable wherein the at least one detector detects variations in the gap to produce a detector signal and wherein the at least one anchor is two anchors and wherein the thermal detector has a first mode resonant frequency and a second mode resonant frequency having a separation of around 120 kHz.

* * * * *